No. 794,970. Patented July 18, 1905.

UNITED STATES PATENT OFFICE.

JOSEPH LOUIS DANZIGER, OF NEW YORK, N. Y., ASSIGNOR TO CASTNER ELECTROLYTIC ALKALI COMPANY, A CORPORATION OF VIRGINIA.

PROCESS OF PURIFYING CARBON TETRACHLORID.

SPECIFICATION forming part of Letters Patent No. 794,970, dated July 18, 1905.

Application filed April 27, 1904. Serial No. 205,235.

*To all whom it may concern:*

Be it known that I, JOSEPH LOUIS DANZIGER, a citizen of the United States, and a resident of the borough of Manhattan, city, county, and State of New York, have invented certain new and useful Improvements in Processes of Purifying Carbon Tetrachlorid, of which the following is a specification.

This invention relates to a process for purifying carbon tetrachlorid by removing impurities therefrom, consisting more especially of carbon bisulfid and sulfur chlorid.

In carrying out my process I digest the crude tetrachlorid with a sulfid solution, said solution being preferably a strong sodium-sulfid solution containing free alkali. In order to hasten the operation, the solution is warmed, a return-condenser being used. Any impurity of carbon bisulfid present in the tetrachlorid is removed, as thiocarbonate, in accordance, for example, with the following reaction:

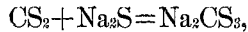

whereas any impurity of sulfur chlorid is decomposed by the water present into sulfur, sulfurous acid, and hydrochloric acid, the said acids combining with the free alkali of the sulfid solution to form salts. After the impurities have been removed the digestion is stopped and the carbon tetrachlorid forming, as it will, a layer distinct from the supernatant sulfid solution is separated and may then be dried and redistilled, thus yielding pure tetrachlorid.

In the foregoing treatment I prefer to use a sulfid solution containing a normal sulfid with an excess of free alkali. However, I can use a solution of a normal sulfid without such excess of alkali. I prefer the normal sulfid with an excess of free alkali because the liberation of sulfureted hydrogen during the digestion is thereby prevented. The presence of an excess of free alkali is further advantageous in that it serves to combine with the sulfurous and hydrochloric acids liberated by the decomposition of any sulfur chlorid present, and thus prevents action of these acids to liberate sulfureted hydrogen, which would be objectionable.

Not only may the sulfids of all the alkalies be employed in my process, but the sulfids of the alkaline earths may also be used.

Another feature of my purification process is that I can treat the waste liquors of the process and reclaim both the metallic sulfids and the carbon bisulfid from the thiocarbonates contained therein. I am thus enabled to use the same sulfid over and over again and prevent waste of carbon bisulfid. This recovery of sulfids and of carbon bisulfid is effected by acidifying the sulfid solution (after it has been used to purify carbon tetrachlorid) with hydrochloric or other suitable acid. The thiocarbonates are thereby broken up and sulfureted-hydrogen gas and carbon bisulfid produced. This breaking up of the thiocarbonates is facilitated by the application of heat. The carbon bisulfid and the sulfureted hydrogen are separated by distillation of the solution, the bisulfid being suitably condensed and the sulfureted hydrogen suitably absorbed in a solution of an alkali, thereby re-forming a sulfid solution which can thereafter be used to purify fresh portions of tetrachlorid. The reclaimed carbon bisulfid may of course be used to prepare fresh portions of tetrachlorid. An instance of these reactions for reclaiming carbon bisulfid and sulfureted hydrogen from the thiocarbonates and the subsequent conversion of the sulfureted hydrogen into sulfid may be represented as follows:

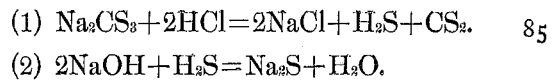

Without further enumeration of equivalents, what I desire to claim as my invention is—

1. The process substantially as herein described for purifying carbon tetrachlorid, which consists in digesting the same with a soluble sulfid.

2. The process substantially as herein described, for purifying carbon tetrachlorid, which consists in digesting the same with an alkaline sulfid.

3. The process substantially as herein described, for purifying carbon tetrachlorid, which consists in digesting the same with a solution of an alkaline sulfid containing an excess of free alkali.

4. The process substantially as herein described, for purifying carbon tetrachlorid, which consists in digesting the same with an alkaline-earth sulfid.

5. The process substantially as herein described, for purifying carbon tetrachlorid, which consists in digesting the same with a solution of an alkaline-earth sulfid containing an excess of free alkali.

6. The process substantially as herein described for purifying carbon tetrachlorid, which consists in separating carbon bisulfid from the tetrachlorid in the form of thiocarbonate by the addition of an alkaline sulfid, and subsequently acidifying the liquor containing the thiocarbonate by a suitable acid.

7. The process substantially as herein described for purifying carbon tetrachlorid, which consists in separating carbon bisulfid from the tetrachlorid in the form of a thiocarbonate by the addition of an alkaline sulfid in the presence of an excess of alkali.

8. The process substantially as herein described for purifying carbon tetrachlorid, which consists in separating carbon bisulfid from the tetrachlorid in the form of a thiocarbonate by the addition of a soluble sulfid, removing the tetrachlorid, and decomposing the said thiocarbonate into carbon bisulfid and sulfureted hydrogen by acidifying with a suitable acid.

In testimony whereof I have signed this specification in the presence of two subscribing witnesses.

JOSEPH LOUIS DANZIGER.

Witnesses:
 EUGENE N. ROBINSON,
 E. W. SCHERR, Jr.